United States Patent
Cox et al.

(10) Patent No.: US 7,231,494 B1
(45) Date of Patent: Jun. 12, 2007

(54) STORAGE AND RETRIEVAL SYSTEM FOR WEB CACHE

(75) Inventors: Alan L. Cox, Houston, TX (US); Y. Charlie Hu, Houston, TX (US); Vijay S. Pai, Houston, TX (US); Vivek S. Pai, Princeton, NJ (US); Willy Zwaenepoel, Houston, TX (US)

(73) Assignee: Ironport System, Inc., San Bruno, CA (US)

(*) Notice: Subject to any disclaimer, the term of this patent is extended or adjusted under 35 U.S.C. 154(b) by 648 days.

(21) Appl. No.: 09/677,979

(22) Filed: Oct. 3, 2000

(51) Int. Cl.
*G06F 12/08* (2006.01)

(52) U.S. Cl. ........................ 711/137; 726/12

(58) Field of Classification Search ............... 345/738, 345/760; 707/10, 100, 103, 104, 205; 709/226; 711/4, 112, 113, 133, 165, 167, 137
See application file for complete search history.

(56) References Cited

U.S. PATENT DOCUMENTS

| | | | |
|---|---|---|---|
| 6,038,574 A | 3/2000 | Pitkow et al. | |
| 6,047,292 A | 4/2000 | Kelly et al. | |
| 6,061,700 A | 5/2000 | Brobst et al. | |
| 6,065,024 A * | 5/2000 | Renshaw | 715/513 |
| 6,163,779 A * | 12/2000 | Mantha et al. | 707/100 |
| 6,345,028 B1 * | 2/2002 | Jaeger | 369/84 |
| 6,389,510 B1 * | 5/2002 | Chen et al. | 711/113 |
| 6,854,018 B1 * | 2/2005 | Li et al. | 709/240 |

OTHER PUBLICATIONS

Ganger & Kaashoek, Embedded Inodes and Explicit Grouping: Exploiting Disk Bandwidth for Small Files—1997, Proceeding of USENIX 1997 Annual Technical Conference, pp. 1-19.*

Maltzahn, Richardson, & Grunwald, Reducing the Disk I/O of WEB Proxy Server Caches—1999, Proceeding of USENIX 1999 Annual Technical Conference, pp. 1-15.*

Craig Stinson, "Running Microsoft Windows 98", 1998 Microsoft Press, pp. 624-632.*

Ron Lee and Gary Tomlinson—Novell Advanced Development Group—"Workload Requirements for a Very High-Capacity Proxy Cache Design".

M. Frans Kaashoek, Dawson R. Engler, Gregory R. Ganger, and Deborah A. Wallach—M.I.T. Laboratory for Computer Science—"Server Operating Systems".

Gregory R. Ganger and M. Frans Kaashoek—M.I.T. Laboratory for Computer Science, Cambridge, MA 02139, USA—"Embedded Inodes and Explicit Grouping: Exploiting Disk Bandwidth for Small Files".

Gary Tomlinson, Drew Major and Ron Lee—High Capacity Internet Middleware: Internet Caching System Architectural Overview.

Carlos Maltzahn, Kathy J. Richardson—Compaq Computer Corporation Network Systems Laboratory, Palo Alto, CA, and Dirk Grunwald—University of Colorado Department of Computer Science, Boulder, CA—"Reducing the Disk I/O of WEB Proxy Server Caches".

* cited by examiner

*Primary Examiner*—Donald Sparks
*Assistant Examiner*—Jesse Diller

(57) ABSTRACT

The invention provides a storage and retrieval routine for Web objects. A Web page typically includes several objects such as text, images and hyper-links to other Web pages. Each Web page and its objects are usually stored in separate files. A storage and retrieval routine stores objects that correspond to the same Web page in co-located positions on a disk. Therefore, when the Web page and its embedded and hyper-linked Web objects are retrieved, the seek time is reduced, thereby reducing the object retrieval time as perceived by a computer user and increasing the number of requests per second that a Web content server can deliver.

19 Claims, 4 Drawing Sheets

STORAGE AND RETRIEVAL SYSTEM FOR WEB CACHE

BACKGROUND OF THE INVENTION

1. Field of the Invention

The present invention relates generally to Web content storage servers and more particularly to Web caching systems.

2. Description of the Prior Art

The Internet is rapidly becoming an important means of providing information and communicating with others, regardless of geographic location. One of the primary innovations responsible for the increase in use of the Internet is the World Wide Web. The World Wide Web (Web) is a set of protocols that enables users to access text, graphical data and other multimedia data from various geographic locations. This text, graphical data and other multimedia data, individually known as Web objects and collectively known as Web content, is typically organized as Web pages. A Web page may be implemented in any document markup language, such as Hypertext Markup Language (HTML) or Extensible Markup Language (XML). Document markup language commands for a Web page are stored in a file on a Web content server.

Other components associated with a Web page, such as images, graphs, charts, icons and other Web objects are typically each stored in a separate file. These components may be embedded in a Web page by including a reference to the embedded object in the document markup commands in a Web page file. An embedded object that is referenced in this way in a Web page is typically downloaded each time the Web page itself is downloaded. Alternatively, using document markup language commands in the Web page file, a Web object may be hyper-linked in a Web page, resulting in a hyper-link to the object being displayed rather than the object itself. To access the hyper-linked object, a user may select the hyper-link and the object is then downloaded. Although Web objects are stored in individual files, many or all of the files containing Web objects embedded in a particular Web page may be retrieved at nearly the same time as the file containing that Web page. Files containing Web objects hyper-linked in that Web page may be retrieved shortly thereafter.

To view a Web page, a computer user may launch a Web browser application on his computer. The Web browser allows a user to enter a Uniform Resource Locator (URL) that specifies the desired Web page. The Web browser then submits a request for the Web page over a communications network to an Internet Service Provider. The Internet Service Provider may satisfy the request in at least two ways.

The Internet Service Provider may submit the request across the Internet to a Web content origin server that stores the Web page data. The overall retrieval time for a request for a particular Web page includes the amount of time necessary to route a request to a Web content origin server, as well as the time to retrieve the Web page data from a storage device on the Web content origin server. Additionally, the overall retrieval time includes download time, which is the amount of time necessary to transfer data from the Web content origin server to a client computer, after being retrieved from disk on the Web content origin server.

Alternatively, an Internet Service Provider may utilize a Web caching server (also commonly referred to as a Web caching proxy) to decrease the overall retrieval time for the request. This Web caching server may be located on the Internet Service Provider's premises and stores frequently accessed Web content. Utilizing a Web caching server may significantly reduce the request routing time and the download time. For accesses that "hit" in the cache, i.e., for which a current copy of the requested data is present in the cache, the request routing and the download time are greatly reduced. In addition, a Web caching server also reduces the bandwidth used by the Internet Service Provider. However, the time necessary to retrieve Web page data from a disk on the Web caching server still remains a significant factor in overall retrieval time.

In some conventional Web caching servers, Web objects are stored by using file system commands for writing data to a magnetic disk. Most operating systems provide an electronic file system and directory structure in which system files, computer programs, and user generated files may be stored. In addition to providing a structure for electronic files, an operating system typically includes software routines and file system commands that may be used to store, modify and access files in the file system. However, the storage and retrieval routines provided with an operating system are generally not aware of the logical relationships between different files, and in particular they are not aware of embedding or hyper-linking relationships between files containing Web content. As a result of storing data in this manner, files and data that are logically related are often not co-located on a magnetic disk. Therefore, retrieval time for Web content stored on a magnetic disk is increased, as explained in the following paragraphs.

Magnetic disks are the most common type of storage device for Web content. One or more magnetic disks may be coupled to a Web content server or a Web caching server. A disk is a mechanical device, including one or more platters, a spindle on which the platters are mounted, and a disk arm having disk heads that read and write data to and from the disk. The disk operates in a continuous rotating motion at a fixed speed while the disk arm may be moved in and out to access portions of the disk. Each platter is divided into a number of annular disk tracks. The platters of the magnetic disk are arranged in a vertical stack, such that corresponding disk tracks on the platters may be accessed without requiring a movement by the disk arm. The corresponding disk tracks are collectively known as a cylinder. Each disk track is further divided into a number of disk sectors that are typically of a fixed size. The amount of time necessary to retrieve data from a magnetic disk includes time allotted to four operations. In order to retrieve data stored on a particular sector of the disk, the proper platter is selected in a process called head selection. A seek is performed such that the disk arm is moved to place a disk head over the proper track. Then, a time period called rotational latency is required to allow the disk head to arrive above the proper sector on the track. Finally, the data is transferred from the sector of the disk. Of the four operations, the time necessary to perform a seek is the most significant and dominates the other three steps. Furthermore, the seek time grows considerably with the length of the seek (the number of cylinders between the start and the end of the seek).

Electronic files and data are typically stored on a magnetic disk as one or more disk blocks. Generally, disk blocks are a fixed size series of bytes (e.g., 512 bytes) that are allocated by a file system to store a portion of a file. An electronic file may be stored as several disk blocks located at different tracks or platters on a magnetic disk. Typically, each file includes an index to all of the disk blocks for that file. In a UNIX® operating system, each file has an inode that stores administrative information about the file, including an index to all of its disk blocks.

The concept of allocating disk blocks for a single file in co-located positions on the disk and thereby reducing disk access times is well known. McKusick et al. teaches a UNIX® file system, the UNIX® Fast File System (FFS), in which allocation of disk blocks for each file is optimized for the purpose of reducing the number of seek operations necessary to read the file. M. K. McKusick, W. N. Joy, S. J. Leffler, and R. S. Fabry, "A fast file system for UNIX®," *ACM Transactions on Computer Systems*, Vol. 2, No. 3, pp. 181-197 (August 1984). Fast File System (FFS) uses the concept of cylinder groups to facilitate file allocation. A cylinder group is a collection of neighboring cylinders. The UNIX® FFS attempts to allocate all inodes of files from the same file system directory in the same cylinder group on a magnetic disk. Additionally, the UNIX® FFS attempts to allocate all disk blocks of a particular file in the same cylinder group as its corresponding inode. Although the UNIX® FFS attempts to store files according to the previously mentioned algorithm, if disk blocks in the desired positions are not available, the UNIX® FFS will store the data in other locations on the disk. The McKusick et al. paper is different from the present invention in that the FFS merely attempts to allocate the disk blocks of a single file in co-located locations on the disk, but does not attempt to store related files in co-located positions. Additionally, the FFS does not provide a method of decreasing disk retrieval times for Web content by taking advantage of the embedding or hyper-linking relationships between files representing Web content.

In another reference, Rosenblum et al. teaches a UNIX® file system, the log-structured file system (LFS), in which the allocation of disk space on a magnetic disk is optimized in order to improve the performance of write operations. M. Rosenblum and J. K. Ousterhout, "The design and implementation of a log-structured file system," *ACM Transactions on Computer Systems*, Vol. 10, No. 1, pp. 26-52 (February 1992). All data for files, including inodes and data blocks, is written to a sequential log on the disk. As a result, write operations are fast because seek operations are avoided while writing. However, the performance of read operations is not improved in the system set forth in Rosenblum et al. Also, the system does not attempt to store related files in co-located positions on the disk, and does not provide a method for decreasing disk retrieval times for Web content by taking advantage of the embedding or hyper-linking relationships between files representing Web content.

Therefore, it would be beneficial to provide a system for storing related files, and in particular Web objects with correlated retrieval times, such that the amount of seek time required to retrieve the files is reduced.

SUMMARY OF THE INVENTION

In one embodiment, the present invention provides a method for storing Web content including storing a first Web object on a storage device. The method further includes storing a second Web object on the storage device in a co-located position from the first Web object, wherein the first and second Web objects have correlated retrieval times.

In another embodiment of the invention, a storage system is provided that includes a microprocessor and a storage device coupled to the microprocessor that is adapted to store Web objects and storage routines. The storage system also includes a storage routine adapted to store first and second Web objects in co-located positions on the storage device, wherein the first and second Web objects have correlated retrieval times.

In yet another embodiment, the invention provides a programmable storage device readable by a machine, tangibly embodying a program of instructions executable by the machine to perform a method for storing Web content. The method embodied on the programmable storage device includes storing a first Web object a storage device. The method further includes storing a second Web object on the storage device in a co-located position from the first Web object, wherein the first and second Web objects have correlated retrieval times.

DETAILED DESCRIPTION OF THE INVENTION

The invention provides a method and system for storing Web content in co-located positions. It is understood that the following embodiments, while illustrative of the invention, represent only some of the possible embodiments and, therefore, should not limit the scope of the invention.

Figure 1:
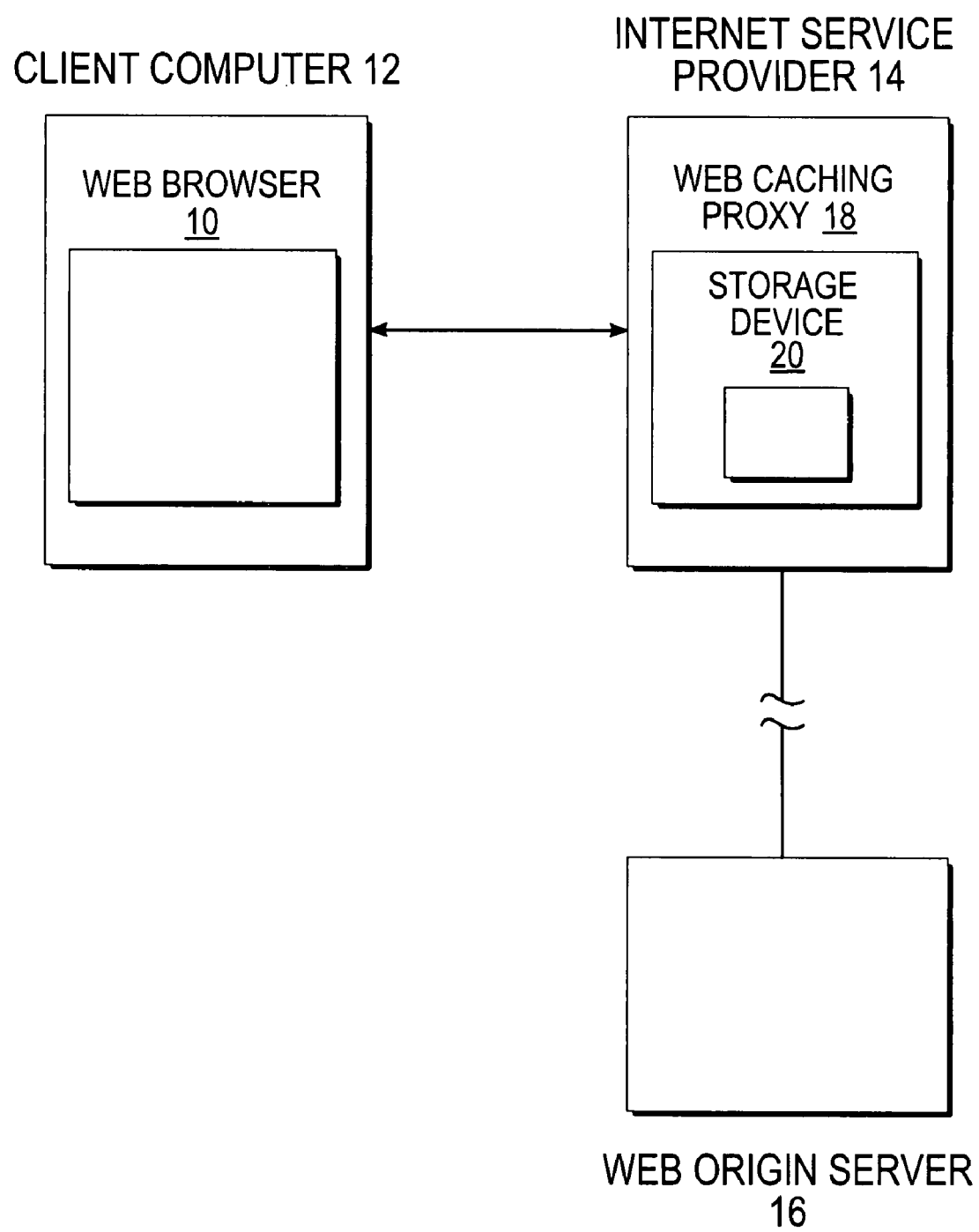
FIG. 1 is a diagram of a communications network including a client computer retrieving Web content in accordance with an embodiment of the invention.

Referring to FIG. 1, a Web browser 10 may be executed on a client computer 12 to view Web pages. A computer user may utilize any conventional Web browser software, such as NETSCAPE NAVIGATOR® by Netscape Corporation or INTERNET EXPLORER® by Microsoft Corporation, which executes on client computer 12 to retrieve Web pages and to download information. The client computer 12 may be in communication with an Internet Service Provider 14 via a modem or other network communications device. The Internet Service Provider 14 essentially permits a client computer 12 to retrieve data from various locations on a communications network, such as the Internet. The client computer 12 submits a request for data using one of several conventional protocols, such as file transfer protocol (FTP) or hyper-text transfer protocol (HTTP). Generally, Web pages are retrieved via the HTTP protocol.

Typically, a computer user specifies the URL for a desired Web page in the Web browser 10 executing on the client computer 12. By communicating with the Internet Service Provider 14, the client computer may retrieve data for a Web page that is located on a Web origin server 16 at a specified internet address. The Internet Service Provider may satisfy a request for a specific URL by downloading a Web page and other data associated with the Web page from the Web origin server 16 specified in the URL.

In order to provide data at increased speeds, the Internet Service Provider 14 may also use a Web caching server 18 located on a computer or server within the Internet Service Provider's network. According to this embodiment, when a URL request is submitted by a client computer 12, the Internet Service Provider 14 may first determine if a current copy of the desired Web page is stored in a storage device 20 on the Web caching server 18. The storage device 20 may be any device capable of storing Web content such as a magnetic disk, optical disk, main memory, or other storage media. If a current copy of the desired Web page is stored on the storage device 20 of the Web caching server 18, the Internet Service Provider 14 retrieves the data directly from the Web caching server 18 and returns the Web page to the client computer 12. However, if a current copy of the Web page is not present on the Web caching server 18, the Internet Service Provider 14 may download the Web page from the Web origin server 16. Because a Web caching server 18 has a finite storage capacity, it may be selective in determining which Web pages to store. The Web caching server 18 may utilize any methodology for selecting particular Web pages to store. For example, the Web caching server 18 may store the most recent Web pages retrieved by the customers of Internet Service Provider 14 (e.g., the 1,000,000 most recently retrieved Web pages). Alternatively, the Web caching server 18 may store Web pages that are most often retrieved by customers of the Internet Service Provider 14. In yet another embodiment, the Web caching server 18 may store Web pages that are related to topics of particular interest to the customers of the Internet Service Provider 14. According to another embodiment, Web caching server 18 may store Web pages that are pre-positioned there by a content delivery system. In yet another embodiment of the invention, the Web caching server 18 may choose to store any combination of the Web pages selected by the previously mentioned methods.

Although conventional Web caching servers reduce download time and the bandwidth necessary to transfer data associated with a Web page, seek time remains an important factor in both the overall retrieval time for a Web page and the maximum number of requests per second a Web caching server can support. Therefore, a Web caching server 18 in accordance with the invention reduces the seek time for retrieving a Web page by storing Web pages that have correlated retrieval times in co-located positions on disk. Web objects with correlated retrieval times are those that will typically be retrieved from a storage device at approximately the same time or in succession. A Web object such as a Web page may have a correlated retrieval time with several other Web objects. For example, a Web page may have a plurality of Web objects embedded in the page that will typically be retrieved each time the Web page is retrieved. The Web page may also include hyper-links to Web objects that may be retrieved via the hyper-links shortly after the Web page is retrieved. In another embodiment, a primary Web page may have other Web pages embedded or hyper-linked, each with retrieval times correlated to the retrieval time of the primary Web page. Embedding and hyper-linking relationships are just two of the many possible examples of Web objects with correlated retrieval times.

Figure 2:
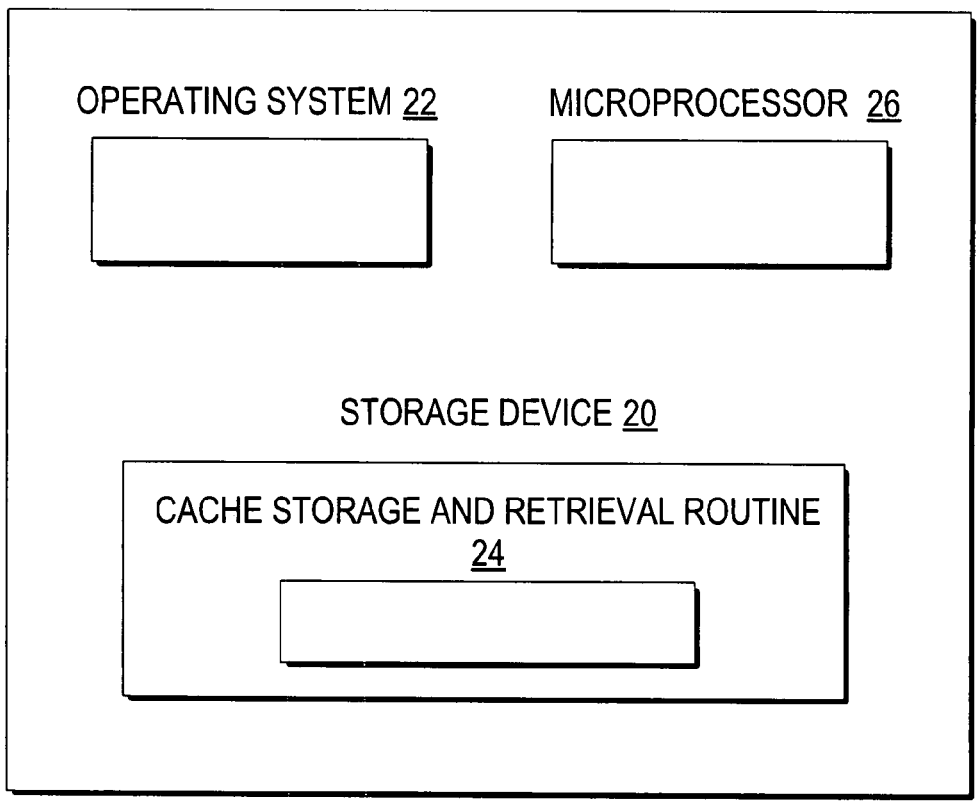
FIG. 2 is a diagram of a Web caching server in accordance with an embodiment of the invention.
Figure 3:
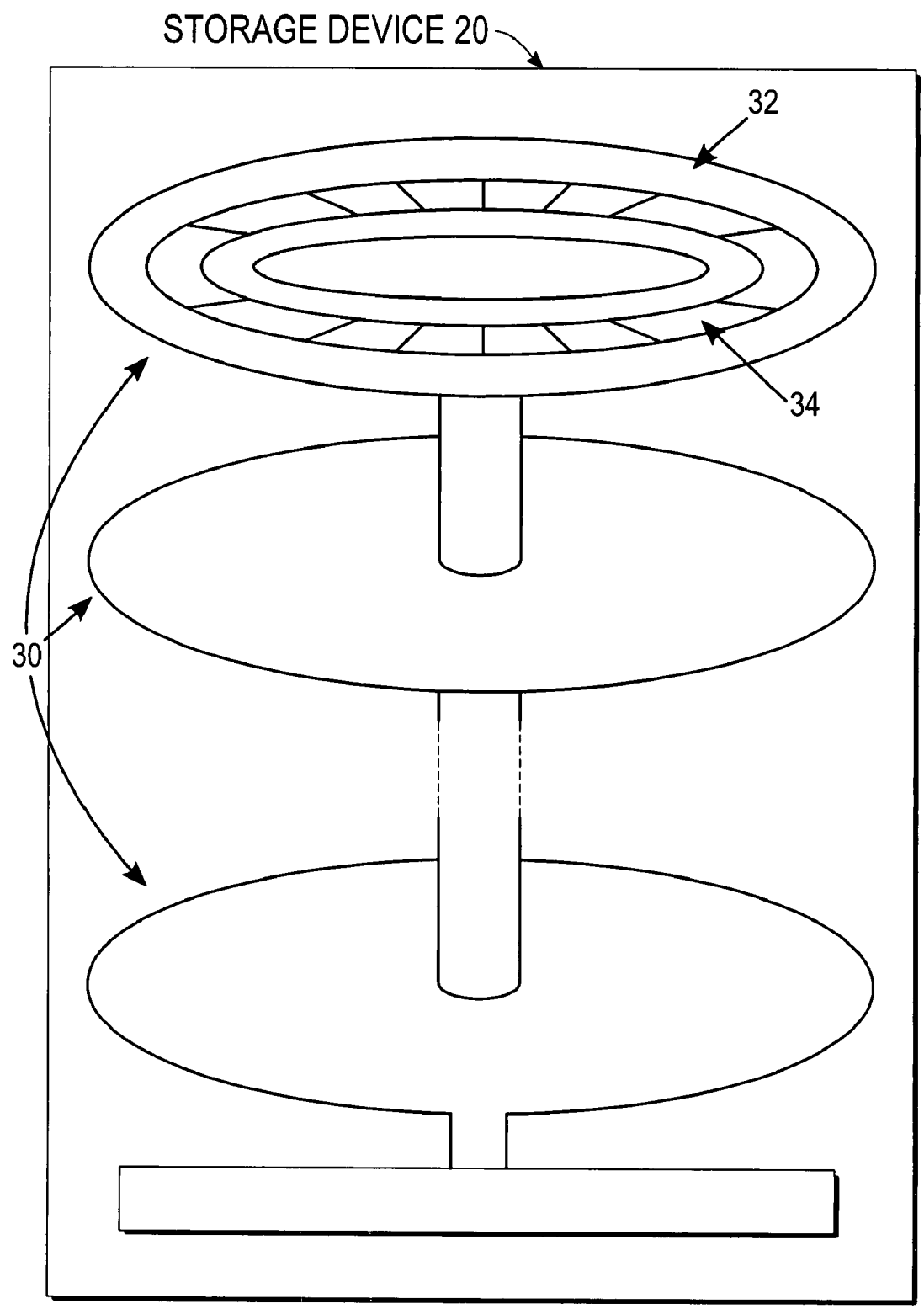
FIG. 3 is a diagram of a magnetic storage device in accordance with an embodiment of the invention.

Referring to FIG. 2, the Web caching server 18 may be a computer or server that includes a microprocessor 26 and executes an operating system, such as WINDOWS NT® by Microsoft Corporation or UNIX®. In the preferred embodiment, the Web caching server 18 includes a UNIX® operating system 22 that performs normal operating system functions and procedures. Additionally, the Web caching server 18 includes a storage device 20 for storing Web page data as well as operating system files and other computer programs. In the preferred embodiment, as depicted in FIG. 3, the storage device 20 consists of one or more magnetic disks (only one shown in FIG. 3) having one or more platters 30. Each platter 30 includes several annular tracks 32 which are divided into sectors 34.

Figure 4:
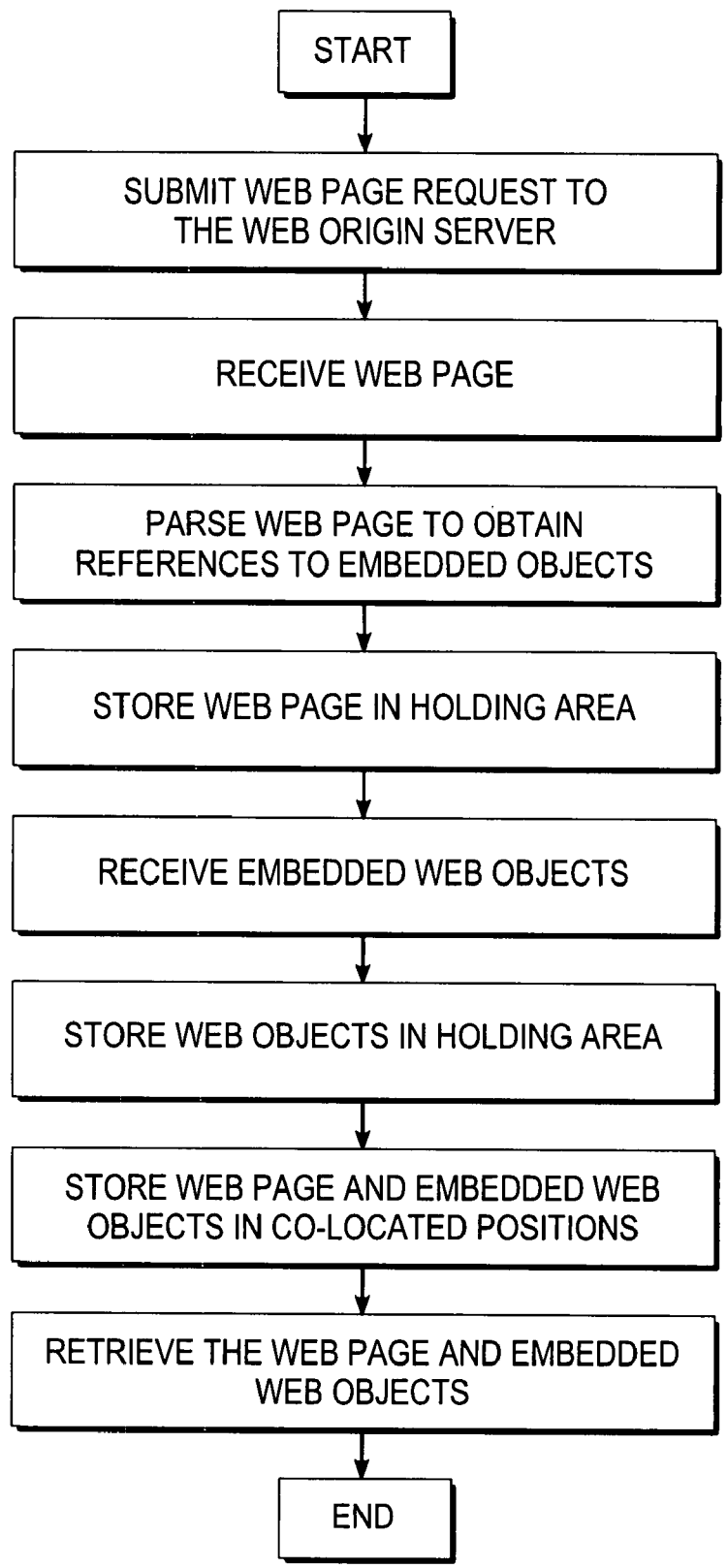
FIG. 4 is a flow diagram depicting a method for storing web content in accordance with one embodiment of the invention.

Again referring to FIG. 2, the Web caching server also includes a cache storage and retrieval routine 24 that stores Web content on the storage device 20, and retrieves it from the device at a later time. The routine 24 may be stored on storage device 20 or any other programmable storage device, such as a magnetic disk, optical storage device, application specific integrated circuit (ASIC), or erasable programmable read-only memory (EPROM). The cache storage and retrieval routine 24 may be executed by the microprocessor 26 of the Web caching server 18 to store Web content. Referring to FIG. 4, when a URL is entered in the Web browser 10 of the client computer 12, the Internet Service Provider 14 may query the Web caching server 18 to determine if data for a particular Web page is available in cache. If data for the Web page is not in cache, then the Internet Service Provider 14 submits the request for the Web page to the Web origin server 16 specified by the URL. When the data for the requested Web page is received by the Internet Service Provider 14, the data may be stored on the Web caching server 18.

The Web caching server 18 may operate in a continuous mode or a batch mode when processing Web pages and Web objects. In continuous mode, the Web caching server 18 processes Web objects continuously as it receives them from the origin server 16. In batch mode, the Web caching server 18 stores Web objects in a temporary cache on a storage device for later processing.

In accordance with continuous mode, each time the Web caching server 18 receives a Web object from the origin server 16, the cache storage and retrieval routine 24 determines whether or not the object is a Web page. If the object is a Web page, the routine 24 parses the Web page to obtain references to any embedded objects. If there are no embedded objects, the cache storage and retrieval routine 24 stores the Web page on the storage device 20 in accordance with the invention. If the Web page includes references to embedded objects, the routine 24 temporarily stores the Web page and indications of the embedded objects in a holding area of main memory of the Web caching server 18. When the Web caching server 18 receives a Web object that is embedded in the Web page, the routine 24 stores the embedded object in the holding area of main memory along with the Web page. Once all of the embedded objects of the Web page have been downloaded to the Web caching server 18 or the memory space allocated to the holding area becomes full, the routine 24 executes a write operation to store the Web page and embedded documents in co-located positions on the storage device 20.

Additionally, if one of the embedded objects of the Web page is itself a Web page, the cache storage and retrieval routine 24 may parse the embedded Web page and obtain references to any Web objects embedded therein. In this manner, the routine 24 may work recursively to store multi-level embedded Web pages in co-located positions on the storage device 20. Also in accordance with the invention, the routine 24 may obtain references to hyper-linked objects while parsing a Web page that is received by the Web caching server 18. The routine 24 may store indications of the hyper-linked objects in the holding area of main memory and may delay storage of the Web page and its embedded objects such that any hyper-linked objects are also stored in co-located positions on the storage device 20.

Alternatively, the Web caching server 18 may operate in batch mode to process Web objects received from the origin server 16. When Web objects are received by the Web caching server 18, the objects may be stored on any storage device of the server 18 in a portion of the device designated for temporary cache. Then, at a later time, such as when the server 18 is responding to fewer requests, the cache storage and retrieval routine 24 may identify and parse Web pages.

In batch mode, the routine 24 identifies a first Web page from the temporary cache. The routine 24 processes the first page by identifying and locating any embedded or hyper-linked Web objects for that Web page in the temporary cache. Then, the routine 24 stores the Web page and the embedded or hyper-linked Web objects in co-located positions, in the same manner as described for continuous mode. The cache storage and retrieval routine 24 repeats this operation until all Web pages in the temporary cache have been processed and stored in co-located positions with their respective Web objects.

In some conventional Web caching servers, as described previously, an operating system provides file system commands to access data on a disk. However, the commands provided by the operating system for writing data to a disk generally do not allow for co-locating a series of data or files on disk. In accordance with the present invention, the cache storage and retrieval routine 24 attempts to store a Web page and each of its embedded or hyper-linked Web objects in co-located positions on the storage device 20. For example, a file containing the Web page may be stored in the same track 32 or on the same cylinder as other Web objects embedded in that Web page. The Web objects embedded in a particular Web page may be stored in contiguous sectors 34 of a particular track 32 or on adjacent tracks 32. Additionally, related Web objects may be stored on adjacent cylinders of the storage device 20, or on closely spaced cylinders (e.g., non-adjacent cylinders that are separated by only a few cylinders).

Again referring to FIG. 4, the cache storage and retrieval routine 24 may be executed to store each of the embedded or hyper-linked Web objects with a requested Web page. The routine 24 may utilize custom software routines rather than operating system supplied file system commands in order to store Web objects in co-located positions. In one embodiment, the custom software routines may execute low level system operations that write each portion of data or file to the storage device 20 in succession. In this embodiment, a low level system operation that writes a single Web object to the storage device 20 may be executed several times in succession to store a Web page and all of the embedded or hyper-linked Web objects in co-located positions. Alternatively, the system operation may store several Web objects on the storage device 20 at one time. For example, the system operation may accept a series of Web objects as parameters, and by one execution of the system operation, may store each Web object on the storage device 20 in co-located positions.

In accordance with another embodiment of the invention, the cache storage and retrieval routine may utilize device driver commands for storing data on the storage device 20. Conventional hardware devices, such as a the storage device 20, come with software routines known as device drivers that interact directly with hardware components and are developed for a particular model of a hardware device. Generally, an operating system for a computer does not interact directly with hardware devices attached to the computer. Rather, the operating system executes software routines of a device driver for a particular hardware device in order to access the device. The cache storage and retrieval routine 24 may utilize routines of a device driver that store a series of files in co-located positions on the storage device 20 in the same manner as described for low level system operations. Alternatively, the cache storage and retrieval routine 24 may implement custom operations that interact directly with the storage device 20, similar to a device driver. When executed, the custom operations store Web objects in co-located positions.

By storing each of the Web objects having correlated retrieval times in co-located positions on the storage device 20, the seek time involved in retrieving the Web objects is significantly reduced. When a Web page is requested from the Web caching server 18, the Web page and all embedded or hyper-linked Web objects are retrieved from the storage device 20, as depicted in FIG. 4. During the retrieval process, the seek time is reduced because a disk head of the storage device 20 does not have to continuously move from one cylinder to another to retrieve a series of Web objects. In conventional Web caching servers, a disk head of a storage device frequently moves between different cylinders of a disk to retrieve these files, portions of which are stored at widely dispersed cylinders on the disk. However, in accordance with the invention, Web objects are stored in co-located positions, allowing for substantially sequential data retrieval and minimizing movement of a disk head.

The embodiments of the invention discussed thus far incorporate the Web caching server 18 having the cache storage and retrieval routine 24 into an Internet Service Provider 14. This is but one possible location for a Web caching server 18 in accordance with the invention. In other embodiments, the Web caching server 18 may be located on the client computer 12, such that Web pages may be cached on a storage device attached to the client computer 12. Alternatively, the Web caching server 18 may be located on a network server computer to which the client computer is attached. In this embodiment, the client computer 12 may access the Internet via the network server computer that is then connected to the Internet Service Provider 14. In other embodiments, the Web caching server 18 may be located between the Internet Service Provider 14 and the Web origin server 16, or a cluster of Web origin servers 16. Still in other embodiments, separate Web caching servers 18 may be utilized at each of the locations described previously. In yet another embodiment, Web caching servers 18 may be used at each of the locations described previously, as part of a Web caching server cluster, consisting of one or more individual Web caching servers 18.

In accordance with another embodiment of the invention, the cache storage and retrieval routine 24 may be implemented on the Web origin server 16 to reduce the retrieval time for Web pages that are not cached in a Web caching server 18. In this embodiment, an additional reconfiguration routine may be implemented to reconfigure the location of Web objects on a storage device after a modification has been made to a Web page. For example, if a Web page designer adds new Web content to a Web page, the reconfiguration routine may be used to ensure that any new Web objects are stored in co-located positions to other Web objects embedded or hyper-linked in the Web page.

It should be appreciated by those skilled in the art that numerous variations from the described embodiments may be implemented without diverging from or limiting the scope of the invention.

What is claimed is:

1. A server for storing Web objects in co-located positions on a storage device, comprising:
   a processor;
   one or more stored sequences of instructions which, when executed by the processor, cause the processor to perform the steps of:
   receiving, at a server from a first client device, a first request for a first Web object;

in response to the first request,
the server obtaining the first Web object and a second Web object; and
the server sending to the first client device the first Web object and the second Web object;
the server causing the first Web object to be stored in a first temporary location on the storage device;
the server causing the second Web object to be stored in a second temporary location on the storage device,
wherein the storage device is included in the server;
wherein the server is a Web caching server;
the server identifying that the second Web object is embedded within the first Web object;
determining that a criterion is satisfied wherein the criterion is satisfied when the Web caching server is processing a number of requests that is below a specified value;
based on a criterion being satisfied,
the server causing the first Web object to be stored as a first file in a first storage location on the storage device, wherein causing the first Web object to be stored as a first file comprises the server causing the first Web object to be moved from the first temporary location to the first storage location; and
the server causing the second Web object to be stored as a second file in a second storage location on the storage device, wherein causing the second Web object to be stored as a second file comprises the server causing the second Web object to be moved from the second temporary location to the second storage location;
wherein the second storage location is selected to be co-located with respect to the first storage location in response to identifying that the second Web object is embedded within the first Web object;
receiving, at the server from a second client device, a second request for the first Web object; and
in response to the second request,
the server obtaining the first Web object by causing the first file to be read from the storage device in a first read operation;
the server obtaining the second Web object by causing the second file to be read from the storage device in a second read operation; and
the server sending to the second client device the first Web object and the second Web object.

2. A server as recited in claim 1, wherein:
the first storage location is co-located with respect to the second storage location on the storage device because the first storage location and second storage location are associated with a relationship; and
the relationship is selected from the group consisting of:
(a) the first storage location and the second storage location are located within a first track of the storage device;
(b) the first storage location is within a first sector of a second track of the storage device, the second storage location is within a second sector of the second track of the storage device, and the first sector is contiguous with the second sector;
(c) the first storage location is within a third track of the storage device, the second storage location is within a fourth track of the storage device, and the third track is adjacent to the fourth track;
(d) the first storage location is within a first cylinder of the storage device, the second storage location is within a second cylinder of the storage device, and the first cylinder is adjacent to the second cylinder;
(e) the first storage location and the second storage location are located within a third cylinder of the storage device; and
(f) the first storage location is within a fourth cylinder of the storage device, the second storage location is within a fifth cylinder of the storage device, and the fourth cylinder is closely spaced with respect to the fifth cylinder.

3. A server as recited in claim 1, wherein:
the first Web object is a Web page;
the second Web object is a component of the Web page;
the component of the Web page is associated with a file type that is selected from the group consisting of a text file type, an image file type, an audio file type, and a video file type; and
the Web page and the component of the Web page have correlated retrieval times as a result of the component of the Web page being embedded within the Web page.

4. A server as recited in claim 1, wherein:
the first Web object is a Web page;
the Web page includes a hyper-link to the second Web object; and
the Web page and the second Web object have correlated retrieval times as a result of the Web page including the hyper-link to second Web object.

5. A server as recited in claim 1, wherein:
the first Web object is a first Web page;
the second Web object is a second Web page; and
the first Web page and the second Web page have correlated retrieval times as a result of the second Web page being embedded within the first Web page.

6. A server as recited in claim 1, wherein:
the first Web object is a first Web page;
the second Web object is a second Web page; and
the server further comprising sequences of instructions which, when executed by the processor, cause the processor to perform the steps of:
the server identifying that a third Web page is embedded within the second Web page;
the server obtaining the third Web page; and
the server causing the third Web page to be stored as a third file in a third storage location on the storage device, wherein the third storage location is selected to be co-located with respect to the second storage location because the third Web page is embedded within the second Web page.

7. An apparatus for storing Web objects in co-located positions on a storage device, comprising:
means for receiving, at a server from a first client device, a first request for a first Web object;
means for, in response to the first request,
the server obtaining the first Web object and a second Web object; and
the server sending to the first client device the first Web object and the second Web object;
means for the server causing the first Web object to be stored in a first temporary location on the storage device;
means for the server causing the second Web object to be stored in a second temporary location on the storage device,
wherein the storage device is included in the server;
wherein the server is a Web caching server;
means for the server identifying that the second Web object is embedded within the first Web object;

means for determining that a criterion is satisfied, wherein the criterion is satisfied when the Web caching server is processing a number of requests that is below a specified value;

means for, based on a criterion being satisfied, the server causing the first Web object to be stored as a first file in a first storage location on the storage device, wherein causing the first Web object to be stored as a first file comprises the server causing the first Web object to be moved from the first temporary location to the first storage location; and the server causing the second Web object to be stored as a second file in a second storage location on the storage device, wherein causing the second Web object to be stored as a second file comprises the server causing the second Web object to be moved from the second temporary location to the second storage location;

wherein the second storage location is selected to be co-located with respect to the first storage location in response to identifying that the second Web object is embedded within the first Web object;

means for receiving, at the server from a second client device, a second request for the first Web object; and means for, in response to the second request, the server obtaining the first Web object by causing the first file to be read from the storage device in a first read operation;

the server obtaining the second Web object by causing the second file to be read from the storage device in a second read operation; and the server sending to the second client device the first Web object and the second Web object.

8. An apparatus as recited in claim 7, wherein:

the first storage location is co-located with respect to the second storage location on the storage device because the first storage location and second storage location are associated with a relationship; and the relationship is selected from the group consisting of:

(a) the first storage location and the second storage location are located within a first track of the storage device;

(b) the first storage location is within a first sector of a second track of the storage device, the second storage location is within a second sector of the second track of the storage device, and the first sector is contiguous with the second sector;

(c) the first storage location is within a third track of the storage device, the second storage location is within a fourth track of the storage device, and the third track is adjacent to the fourth track;

(d) the first storage location is within a first cylinder of the storage device, the second storage location is within a second cylinder of the storage device, and the first cylinder is adjacent to the second cylinder;

(e) the first storage location and the second location are located within a third cylinder of the storage device; and (f) the first storage location is within a fourth cylinder of the storage device, the second storage location is within a fifth cylinder of the storage device, and the fourth cylinder is closely spaced with respect to the fifth cylinder.

9. An apparatus as recited in claim 7, wherein:

the first Web object is a Web page;

the second Web object is a component of the Web page;

the component of the Web page is associated with a file type that is selected from the group consisting of a text file type, an image file type, an audio file type, and a video file type; and the Web page and the component of the Web page have correlated retrieval times as a result of the component of the Web page being embedded within the Web page.

10. An apparatus as recited in claim 7, wherein:

the first Web object is a Web page;

the Web page includes a hyper-link to the second Web object; and the Web page and the second Web object have correlated retrieval times as a result of the Web page including the hyper-link to second Web object.

11. An apparatus as recited in claim 7, wherein:

the first Web object is a first Web page;

the second Web object is a second Web page; and the first Web page and the second Web page have correlated retrieval times as a result of the second Web page being embedded within the first Web page.

12. An apparatus as recited in claim 7, wherein:

the first Web object is a first Web page;

the second Web object is a second Web page; and the apparatus further comprises:

means for the server identifying that a third Web page is embedded within the second Web page;

means for the server obtaining the third Web page; and means for the server causing the third Web page to be stored as a third file in a third storage location on the storage device, wherein the third storage location is selected to be co-located with respect to the second storage location because the third Web page is embedded within the second Web page.

13. A computer-readable storage medium carrying one or more sequences of instructions for storing Web objects in co-located positions on a storage device, which instructions, when executed by one or more processors, cause the one or more processors to perform the steps of:

receiving, at a server from a first client device, a first request for a first Web object;

in response to the first request, the server obtaining the first Web object and a second Web object; and the server sending to the first client device the first Web object and the second Web object;

the server causing the first Web object to be stored in a first temporary location on the storage device;

the server causing the second Web object to be stored in a second temporary location on the storage device, wherein the storage device is included in the server;

wherein the server is a Web caching server;

the server identifying that the second Web object is embedded within the first Web object;

determining that a criterion is satisfied, wherein the criterion is satisfied when the Web caching server is processing a number of requests that is below a specified value;

based on a criterion being satisfied, the server causing the first Web object to be stored as a first file in a first storage location on the storage device, wherein causing the first Web object to be stored as a first file comprises the server causing the first Web object to be moved from the first temporary location to the first storage location; and the server causing the second Web object to be stored as a second file in a second storage location on the storage device, wherein causing the second Web object to be stored as a second file comprises the server causing the second Web object to be moved from the second temporary location to the second storage location;

wherein the second storage location is selected to be co-located with respect to the first storage location in response to identifying that the second Web object is embedded within the first Web object;

receiving, at the server from a second client device, a second request for the first Web object; and in response to the second request,
the server obtaining the first Web object by causing the first file to be read from the storage device in a first read operation;
the server obtaining the second Web object by causing the second file to be read from the storage device in a second read operation; and
the server sending to the second client device the first Web object and the second Web object.

14. A computer-readable storage medium as recited in claim 13, wherein:
the first storage location is co-located with respect to the second storage location on the storage device because the first storage location and second storage location are associated with a relationship; and
the relationship is selected from the group consisting of:
(a) the first storage location and the second storage location are located within a first track of the storage device;
(b) the first storage location is within a first sector of a second track of the storage device, the second storage location is within a second sector of the second track of the storage device, and the first sector is contiguous with the second sector;
(c) the first storage location is within a third track of the storage device, the second storage location is within a fourth track of the storage device, and the third track is adjacent to the fourth track;
(d) the first storage location is within a first cylinder of the storage device, the second storage location is within a second cylinder of the storage device, and the first cylinder is adjacent to the second cylinder;
(e) the first storage location and the second storage location are located within a third cylinder of the storage device; and
(f) the first storage location is within a fourth cylinder of the storage device, the second storage location is within a fifth cylinder of the storage device, and the fourth cylinder is closely spaced with respect to the fifth cylinder.

15. A computer-readable storage medium as recited in claim 13, wherein:
the first Web object is a Web page;
the second Web object is a component of the Web page;
the component of the Web page is associated with a file type that is selected from the group consisting of a text file type, an image file type, an audio file type, and a video file type; and
the Web page and the component of the Web page have correlated retrieval times as a result of the component of the Web page being embedded within the Web page.

16. A computer-readable storage medium as recited in claim 13, wherein:

the first Web object is a Web page;
the Web page includes a hyper-link to the second Web object; and
the Web page and the second Web object have correlated retrieval times as a result of the Web page including the hyper-link to second Web object.

17. A computer-readable storage medium as recited in claim 13, wherein:
the first Web object is a first Web page;
the second Web object is a second Web page; and
the first Web page and the second Web page have correlated retrieval times as a result of the second Web page being embedded within the first Web page.

18. A computer-readable storage medium as recited in claim 13, wherein:
the first Web object is a first Web page;
the second Web object is a second Web page; and
the computer-readable storage medium further comprises instructions which, when executed by the one or more processors, cause the one or more processors to perform the steps of:
the server identifying that a third Web page is embedded within the second Web page;
the server obtaining the third Web page; and
the server causing the third Web page to be stored as a third file in a third storage location on the storage device, wherein the third storage location is selected to be co-located with respect to the second storage location because the third Web page is embedded within the second Web page.

19. A method for storing Web objects in co-located positions on a storage device, comprising:
receiving, at a server from a first client device, a first request for a first Web object;
in response to the first request,
the server obtaining the first Web object and a second Web object; and
the server sending to the first client device the first Web object and the second Web object;
the server causing the first Web object to be stored in a first temporary location on the storage device;
the server causing the second Web object to be stored in a second temporary location on the storage device,
wherein the storage device is included in the server;
wherein the server is a Web caching server;
the server identifying that the second Web object is embedded within the first Web object;
determining that a criterion is satisfied, wherein the criterion is satisfied when the Web caching server is processing a number of requests that is below a specified value;
based on a criterion being satisfied,
the server causing the first Web object to be stored as a first file in a first storage location on the storage device, wherein causing the first Web object to be stored as a first file comprises the server causing the first Web object to be moved from the first temporary location to the first storage location; and
the server causing the second Web object to be stored as a second file in a second storage location on the storage device, wherein causing the second Web object to be stored as a second file comprises the server causing the second Web object to be moved from the second temporary location to the second storage location;
wherein the second storage location is selected to be co-located with respect to the first storage location in response to identifying that the second Web object is embedded within the first Web object;

receiving, at the server from a second client device, a second request for the first Web object; and in response to the second request, the server obtaining the first Web object by causing the first file to be read from the storage device in a first read operation;

the server obtaining the second Web object by causing the second file to be read from the storage device in a second read operation; and the server sending to the second client device the first Web object and the second Web object.

* * * * *